US010666999B2

(12) United States Patent
Kolekar et al.

(10) Patent No.: US 10,666,999 B2
(45) Date of Patent: *May 26, 2020

(54) METHODS AND APPARATUS FOR ADAPTIVE VIDEO TRANSMISSION BASED ON CHANNEL CAPACITY

(71) Applicant: Intel Corporation, Santa Clara, CA (US)

(72) Inventors: Abhijeet Kolekar, Hillsboro, OR (US); Inching Chen, Beaverton, OR (US); Karthik Veeramani, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/543,203

(22) Filed: Aug. 16, 2019

(65) Prior Publication Data

US 2020/0045355 A1 Feb. 6, 2020

Related U.S. Application Data

(63) Continuation of application No. 15/476,283, filed on Mar. 31, 2017, now Pat. No. 10,390,070.

(51) Int. Cl.
*H04N 21/2662* (2011.01)
*H04N 19/115* (2014.01)
(Continued)

(52) U.S. Cl.
CPC ....... *H04N 21/2662* (2013.01); *H04N 19/115* (2014.11); *H04N 19/164* (2014.11);
(Continued)

(58) Field of Classification Search
CPC ............. H04N 21/2662; H04N 19/115; H04N 19/184; H04N 21/4122; H04N 21/44227;
(Continued)

(56) References Cited

U.S. PATENT DOCUMENTS

| 2012/0076199 A1* | 3/2012 | Gao .................. H04N 21/4122 375/240.02 |
| 2014/0141714 A1* | 5/2014 | Ghosh .................. H04W 4/023 455/39 |

(Continued)

OTHER PUBLICATIONS

United States Patent and Trademark Office, "Non-Final Office Action," issued in connection with U.S. Appl. No. 15/476,283, dated Oct. 4, 2018, 22 pages.

(Continued)

*Primary Examiner* — William C Vaughn, Jr.
*Assistant Examiner* — Jae N Noh
(74) *Attorney, Agent, or Firm* — Hanley, Flight & Zimmerman, LLC

(57) ABSTRACT

Example methods and apparatus for adaptive video transmission based on channel capacity are disclosed. A first wireless display source device for adaptive video transmission based on channel capacity includes a video bit rate determiner, a comparer and a video bit rate setter. The video bit rate determiner is to determine a collective video bit rate based on a current number of wireless display connections in a peer-to-peer (P2P) group multiplied by a current video bit rate of the first wireless display source device. The P2P group includes a second wireless display source device in proximity to the first wireless display source device. The comparer is to compare the collective video bit rate to a wireless display capacity in proximity to the first wireless display source device. The video bit rate setter is to set the current video bit rate of the first wireless display source device to a first adjusted video bit rate value in response to the comparer determining that the collective video bit rate is greater than the wireless display capacity, and to set the current video bit rate of the first wireless display source device to a second adjusted video bit rate value in response to the comparer determining that the collective video bit rate is not greater than the wireless display capacity.

20 Claims, 9 Drawing Sheets

(51) Int. Cl.

| | |
|---|---|
| *H04N 19/164* | (2014.01) |
| *H04N 19/177* | (2014.01) |
| *H04N 21/4363* | (2011.01) |
| *H04N 21/4402* | (2011.01) |
| *H04N 19/184* | (2014.01) |
| *H04N 21/41* | (2011.01) |
| *H04N 21/6373* | (2011.01) |
| *H04N 21/442* | (2011.01) |
| *H04W 4/08* | (2009.01) |
| *H04W 8/00* | (2009.01) |

(52) U.S. Cl.
CPC ......... *H04N 19/177* (2014.11); *H04N 19/184* (2014.11); *H04N 21/4122* (2013.01); *H04N 21/43637* (2013.01); *H04N 21/4402* (2013.01); *H04N 21/44227* (2013.01); *H04N 21/6373* (2013.01); *H04W 4/08* (2013.01); *H04W 8/005* (2013.01)

(58) Field of Classification Search
CPC .... H04N 21/6373; H04W 4/08; H04W 8/005; H04W 48/16; H04W 8/16
USPC .................................................... 375/240.02
See application file for complete search history.

(56) References Cited

U.S. PATENT DOCUMENTS

| | | |
|---|---|---|
| 2014/0219088 A1 | 8/2014 | Oyman et al. |
| 2015/0358117 A1 | 12/2015 | Li et al. |
| 2016/0173939 A1 | 6/2016 | Iwami et al. |
| 2017/0118530 A1 | 4/2017 | Amano et al. |

OTHER PUBLICATIONS

United States Patent and Trademark Office, "Notice of Allowance and Fee(s) Due," issued in connection with U.S. Appl. No. 15/476,283, dated Apr. 10, 2019, 23 pages.

\* cited by examiner

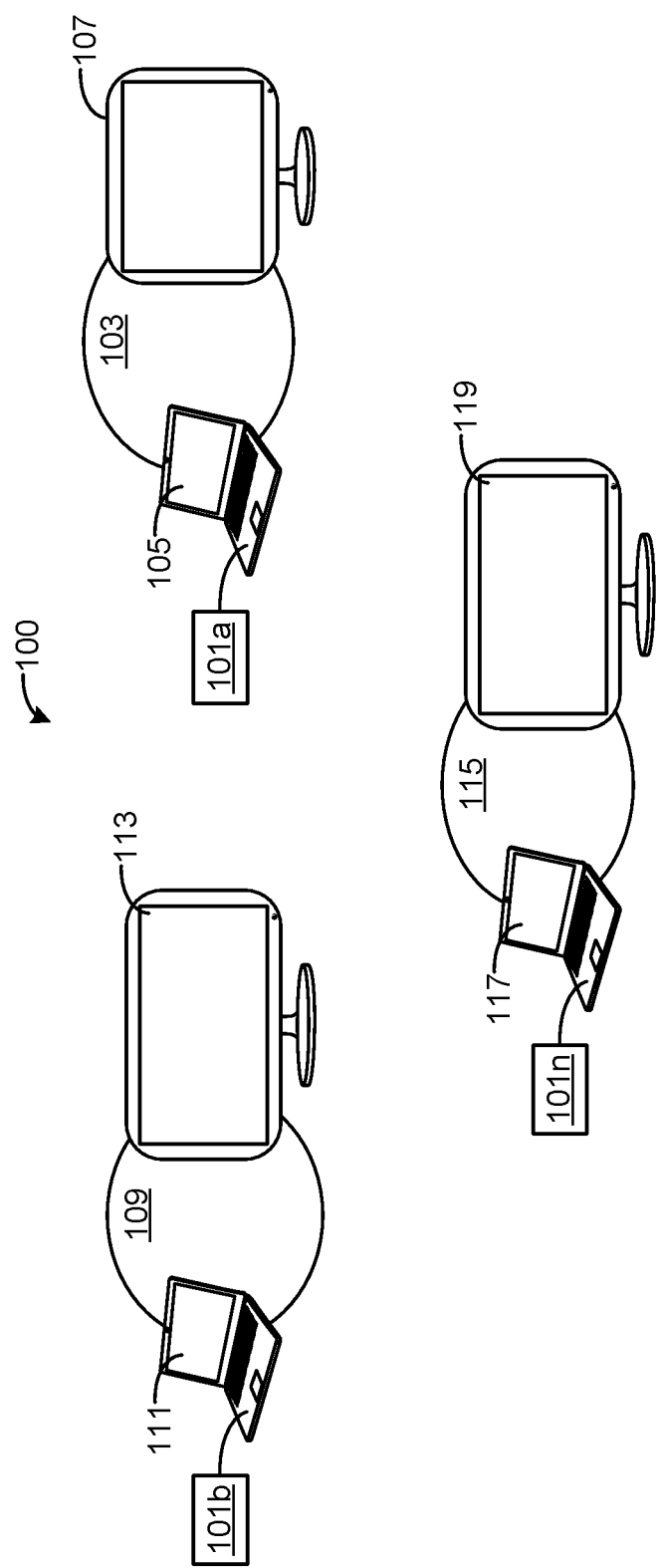

METHODS AND APPARATUS FOR ADAPTIVE VIDEO TRANSMISSION BASED ON CHANNEL CAPACITY

RELATED APPLICATIONS

This application arises from a continuation of U.S. patent application Ser. No. 15/476,283, filed Mar. 31, 2017, entitled "Methods and Apparatus for Adaptive Video Transmission Based on Channel Capacity," the entirety of which is hereby incorporated herein by reference.

FIELD OF THE DISCLOSURE

This disclosure relates generally to video transmission and, more particularly, to methods and apparatus for adaptive video transmission based on channel capacity.

BACKGROUND

Conventional electronic devices such as personal computers (PCs), mobile phones and tablets, etc., can utilize wireless display (WiDi) technology to send screen content to remote display devices. Industry standards for wireless connections of such devices to displays such as Miracast™ enable electronic devices to stream local content to remote display devices that are attached to a Miracast™ sink device (e.g., a video receiver). Conventionally, when using WiDi, or Miracast™, a WiDi source device (e.g., a video transmitter) initiates a connection to the WiDi receiver.

The WiDi source device scans by sending, and receiving, respectively, probe requests, and probe responses, over wireless communication channels. The probe responses provide a list of available sink devices using WiFi Direct™ protocol. A user can select the WiDi receiver, to which they desire to connect, from the list, and thereupon complete a connection to that device. Upon successful connection setup, real time streaming protocol (RTSP) is used to negotiate capabilities, settings, etc. After successful RTSP negotiations, the WiDi source device can start streaming the local screen or video content to the WiDi sink device, as WiDi allows a WiDi source device to transmit data such as encoded video over a wireless channel to a WiDi receiver. The encoded data is transmitted over the wireless channel, from a wireless transmitter that is connected to, or is a part of, the WiDi source device, to a WiDi adapter that is connected to, or is a part of the WiDi receiver (e.g., a high definition television (HDTV)). The encoded video data that is received at the WiDi receiver is decoded and displayed (e.g., on a HDTV display). Currently, WiDi unsatisfactorily addresses conditions of the wireless channel that can negatively affect viewing experience.

BRIEF DESCRIPTION OF THE DRAWINGS

FIG. 1 shows an operating environment of a plurality of adaptive video transmitters according to one example.

Figure 2A:
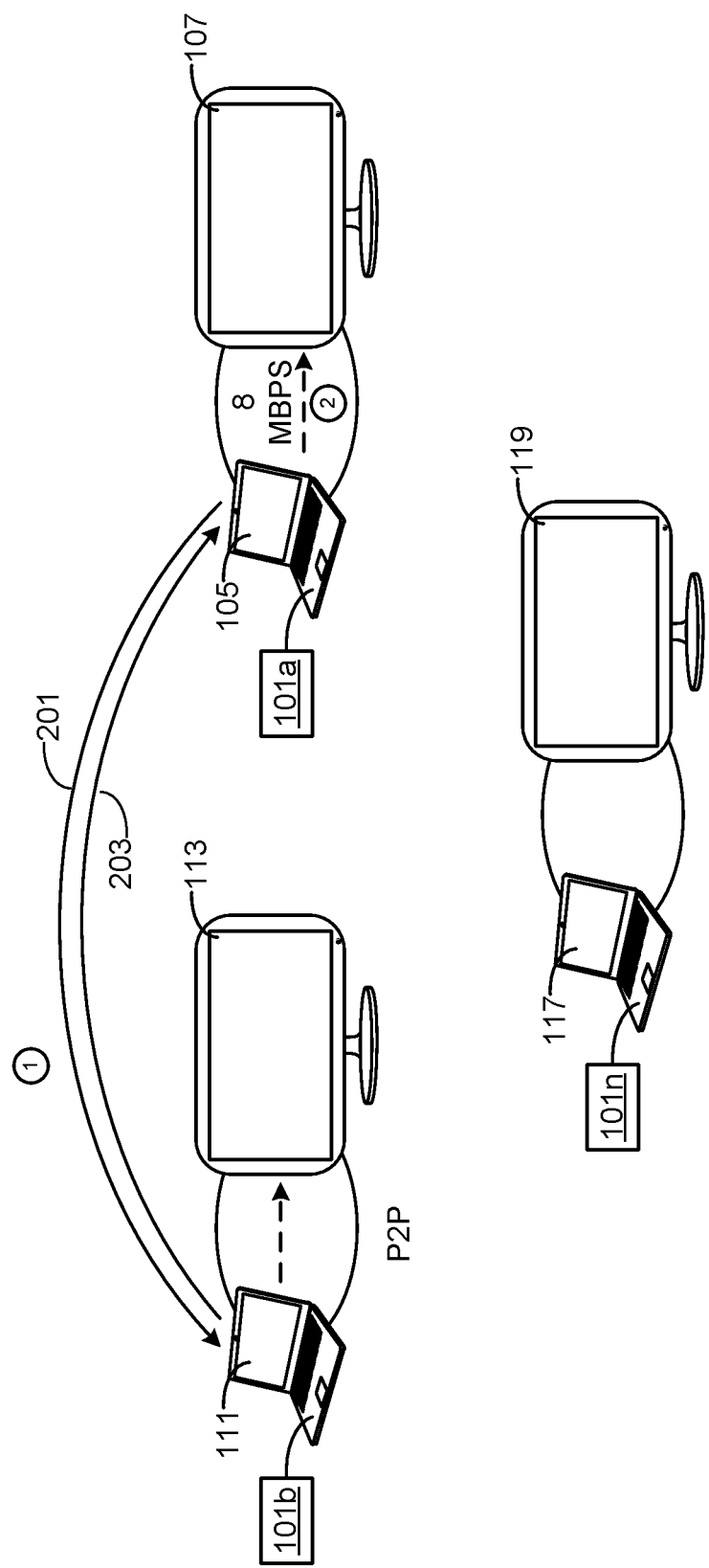
FIG. 2A illustrates operations performed to determine wireless display capacity based on information received in response to a probe request according to one example.

Although example inventions have been disclosed herein, such inventions are not intended to be limited to the specific forms set forth herein. On the contrary, examples disclosed herein are intended to cover such alternatives, modifications, and equivalents as can be reasonably included within the scope of the inventions as defined by the appended claims.

DETAILED DESCRIPTION

In the following detailed description, numerous specific details such as specific method orders, structures, elements, and connections have been set forth. It is to be understood however that these and other specific details need not be utilized to practice examples disclosed herein. In other circumstances, well-known structures, elements, or connections have been omitted, and/or have not been described in particular detail in order to avoid unnecessarily obscuring of examples disclosed herein.

References within the specification to "one example" or "an example" are intended to indicate that a particular feature, structure, or characteristic described in connection with the example is included in at least one example of the present invention. The appearance of the phrase "in one example" in various places within the specification are not necessarily all referring to the same example, nor are separate or alternative examples mutually exclusive of other examples. Moreover, various features are described which may be exhibited by some examples and not by others. Similarly, various requirements are described which may be requirements for some examples but not other examples.

Some portions of the detailed descriptions, which follow, are presented in terms of procedures, steps, logic blocks, processing, and other symbolic representations of operations on data bits within a computer memory. These descriptions and representations are examples used by those skilled in the data processing arts to effectively convey the substance of their work to others skilled in the art. A procedure, computer executed step, logic block, process, etc., is here, and generally, conceived to be a sequence of steps or instructions leading to a desired result. The steps are those requiring physical manipulations of physical quantities. Usually, these quantities are capable of being stored, transferred, combined, compared, and otherwise manipulated in a computer system. It has proven convenient at times, principally for reasons of common usage, to refer to these signals as bits, values, elements, symbols, characters, terms, numbers, or the like.

In wireless display systems, encoded video data is transmitted over a wireless channel. Thus, video quality is dependent on wireless channel conditions. Wireless channel conditions can change due to several reasons, including surrounding interference, noise, distance between transmitter and receiver, other WiFi devices, etc. If the wireless channel condition degrades, the capacity of the wireless channel may not be able to support the selected wireless display data rate, and video quality can be deteriorated due to increasing number of lost packets or lengthy packet retransmission cycles.

In one example, a wireless display technology (e.g., WiDi) is used to implement ABR (adaptive bitrate) video encoding, e.g., determining wireless or WiFi channel capacity and changing the video encoding or bit rate adaptively based on the wireless channel condition as measured by channel capacity. ABR allows the video bit rate to be gradually and cautiously increased according to channel capacity. In addition, ABR allows the video bit rate to be rapidly decreased to a value that is below channel capacity.

Because video quality saturates at such high rate, users may not be able to differentiate between the quality of video of a first bit rate and a second lower bit rate. In one example, a higher bound on the video bit rate can be set according to objective video quality scores that are supplied by users. Setting a higher bound can also bring extra margin to address possible wireless channel defects. Examples described herein provide an innovative way to use existing peer-to-peer (P2P) group information to set a target bit rate when establishing wireless device connections.

FIG. 1 shows an example operating environment 100 of a plurality of adaptive transmitters 101a-101n. Adaptive transmitters 101a-101n enable electronic devices (e.g., tablets, smartphones, laptop computers, desktop computers) to determine the existing (current) wireless channel conditions in proximity (e.g., WiFi Direct range, a logical range) to the electronic devices and to adapt attributes of their video transmissions to the wireless channel conditions (individually and/or collectively). This improves the video viewing experience of users of the electronic devices. In one example, adaptive transmitters 101a-101n enable the bit rates of video transmissions to be set (selected, adjusted) based on existing wireless channel conditions (e.g., as measured by channel capacity). In one example, adaptive transmitters 101a-101n, set the bit rates of video transmissions in an automated manner. In one example, bit rate selection/adjustment may or may not be based on user approval of a proposed selection/adjustment (e.g., bit rate selection/adjustment made after the user is prompted to approve and has approved a proposed selection/adjustment). In one example, each adaptive transmitter, of adaptive transmitters 101a-101n, is associated with an electronic device that can transmit video to one or more displays that are located at different places in proximity to the electronic device. In general, adaptive transmitters 101a-101n, enable video transmissions to be adapted such that the video viewing experience for users of electronic devices, across the different locations, may be improved. Improvements to the video viewing experience can include but are not limited to the elimination of video stutters and video freezes.

In the FIG. 1 example, operating environment 100 includes first P2P group 103, first device 105, first wireless display 107, second P2P group 109, second device 111, second wireless display 113, third P2P group 115, third device 117 and third wireless display 119. Each device, 105, 111 and 117 includes respective adaptive transmitters 101a, 101b and 101n. In one example, more adaptive transmitters/devices than are shown in FIG. 1 can be a part of operating environment 100. In one example, the only limitation on the number of adaptive transmitters/devices that can be supported in environment 100 is whether the calculated bit rate for that number of devices is at a quality level that is acceptable. In one example, the acceptable quality level can be predetermined. In one example, the acceptable quality level can be determined at any suitable point before, during or after the adaptive transmitters/devices begin to transmit or stream to a wireless display. Additionally, in the FIG. 1 example, each device, 105, 111 and 117 operates as the "group owner" and wireless display source device (the electronic device that transmits or streams a local screen or video content to a wireless display). In FIG. 1, although a single electronic device and wireless display is shown as being located in each P2P group (e.g., 103, 109 and 115), in some examples, each P2P group, 103, 109 and 115 can include a plurality of devices. In one example, the P2P groups can be located in adjacent, or near adjacent rooms of a building, such as conference rooms. In other examples, the P2P groups can be located in any suitable operating environments. In one example, when operating on the same wireless channel, the wireless device connections of the P2P groups can affect each other because they share the same bandwidth.

In some examples, each device of devices 105, 111 and 117 can directly connect with one or more other devices of devices 105, 111 and 117 using a peer-to-peer (P2P) communication protocol. In some examples the P2P communication protocol that is used is Miracast™. In other examples, the P2P communication protocol that is used is a communication protocol other than Miracast™. In one example, the estimated wireless display capacity in proximity to a device (e.g., 105, 111 or 117) acting as a wireless display source can be initially determined based on information obtained using a P2P communication protocol (see description of operation of adaptive transmitters 101a, 101b and 101n below). Based on this information, the device can have its video encoding or bit rate set in accordance with the existing wireless channel condition (e.g., measured by channel capacity). Thereafter, adaptive transmitters 101a, 101b and 101n can periodically conduct a scan of the transmission channel to update the estimated wireless display capacity in proximity to a given wireless display source, and based on the update, set the bit rate of the wireless display source accordingly.

As described above, adaptive transmitters 101a-101n enable each respective device 105, 111 and 117 to adapt transmissions to the current condition of a communication channel. For example, as a part of its operation, adaptive transmitter 101a of device 105 (when device 105 is operating as a wireless display source device), based on information that is received from a wireless channel scan associated with a formation of a P2P group 103 that includes device 105 and wireless display 107—determines a first wireless display capacity in proximity of device 105, determines the video bit rate of the devices with wireless display connections in the proximity and compares a video bit rate of wireless display connections in the proximity to the wireless display capacity. In some examples, based on the comparing, adaptive transmitter 101a determines whether a video bit rate of device 105 should be adjusted. In some examples, as part of a periodic scan of the wireless operating channel, subsequent determinations of the wireless display capacity are made based on wireless display connections in the proximity of the wireless display source device.

In one example, each of the adaptive transmitters 101a-101n use P2P information to generate estimates of the number of wireless device connections that can be supported at a given bitrate. From this calculation a bitrate operating baseline for wireless devices is established. Establishing the bitrate baseline enables users to avoid having to react to a large fluctuation or drastic change of wireless bandwidth, as the causes of such can be factored into the establishment of the operating baseline. As described above, an initial scan for connected devices is provided per P2P communication protocol (a response to a probe request that provides information about number of wireless device connections). Subsequently, scans are performed periodically. In one example, a scan for updates is performed every 120 seconds. In other examples, a scan is performed at any periodicity that is deemed suitable. In comparison to conventional approaches, examples described herein take greater advantage of the available P2P group information. For example, the performance of scans as directed after the initial scan described above, minimizes the occurrences of undesirably lengthy rate adjustment periods.

In one example, adaptive transmitters 101a-101n can comprise software, firmware and/or hardware that is a part of other software, firmware and/or hardware that executes on devices 105, 111 and 117. In other examples, adaptive transmitters 101a-101n can be separate from, but operate cooperatively with, other software, firmware and/or hardware that executes on devices 105, 111 and 117. A more detailed description of the operation of adaptive transmitters, 101a-101n, is provided with reference to FIGS. 2A-2C as described in further detail below.

Operation

Figure 2B:
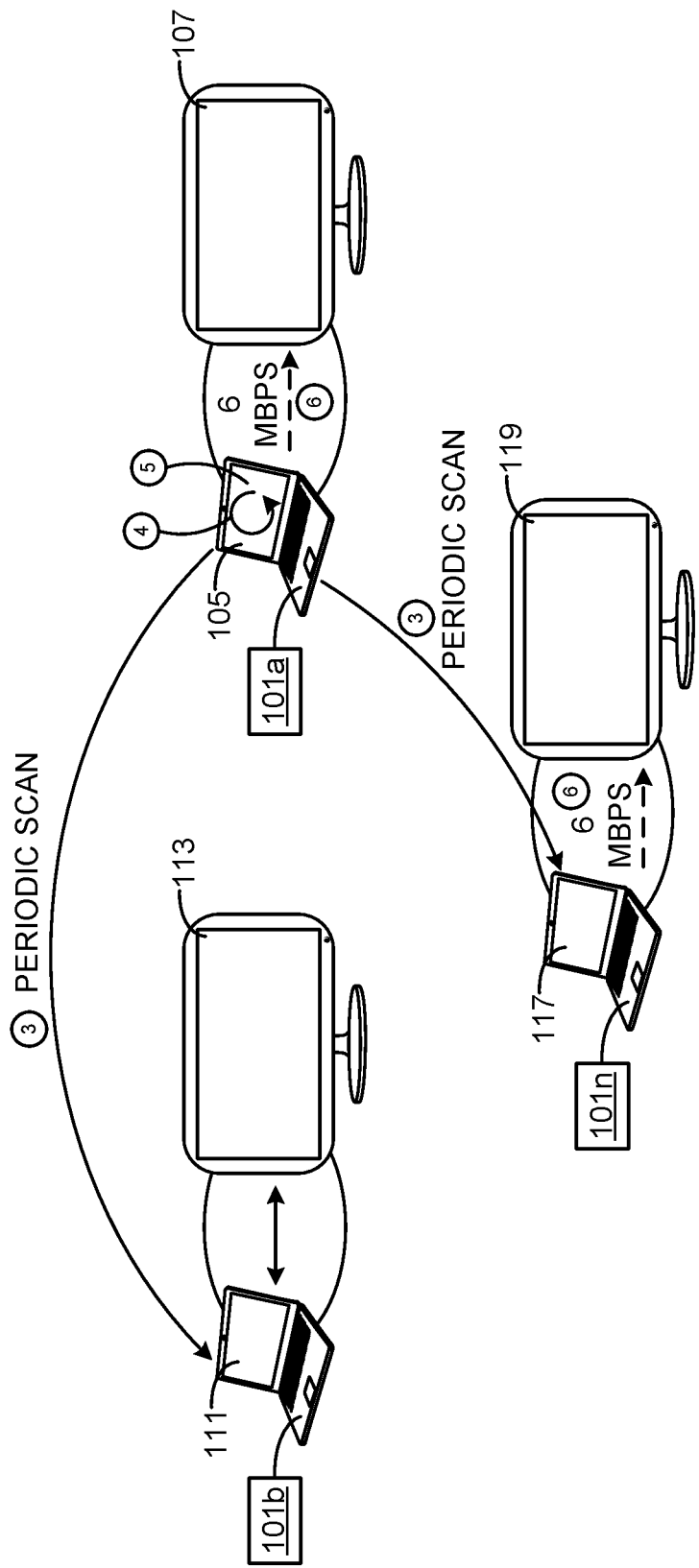
FIG. 2B illustrates operations performed to determine wireless display capacity including the execution of a periodic scan according to one example.
Figure 2C:
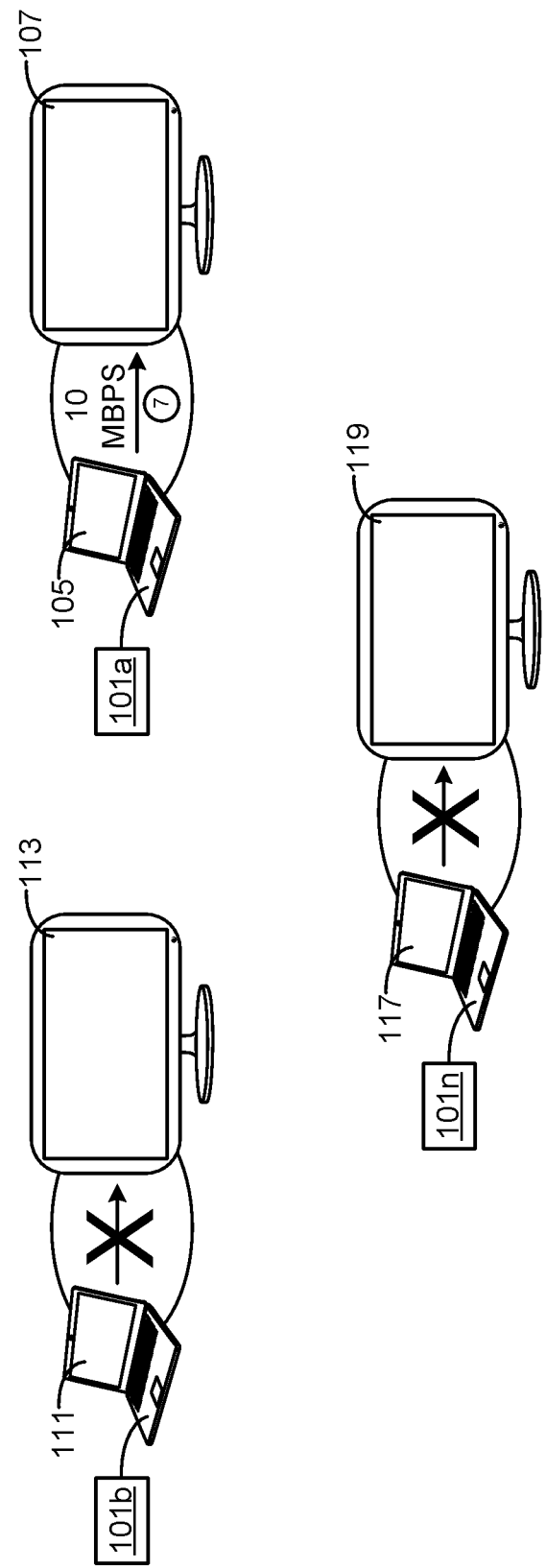
FIG. 2C illustrates operations that include adjusting video transmission bitrate according to one example.

FIGS. 2A-2C illustrate operations performed by adaptive transmitters 101a-101n according to one example. These operations, which relate to adaptive video transmission, are only examples. It should be appreciated that other operations not illustrated in FIGS. 2A-2C can be performed in accordance with one example. In the description of FIGS. 2A-2C below, adaptive video transmission operations associated with adaptive transmitter 101a, device 105 and wireless display 107 are featured for purposes of clarity and brevity. However, the descriptions are applicable to the other adaptive transmitters, devices and wireless displays described herein.

Referring to FIG. 2A, at ①, based on a response 203 to a probe request 201, executed by adaptive transmitter 101a, the wireless display capacity in the proximity of device 105 is determined. In one example, probe request 201 elicits information about P2P groups, and the probe response 203 provides information about the P2P groups, including the number of client devices, such as wireless displays, that are connected in the P2P groups. The wireless display capacity is determined from the connected wireless display information that is transmitted in the response to the probe request as a part of a P2P wireless communication protocol (e.g., wireless displays or "clients" connected in proximity to device 105). In one example the wireless communication protocol is the WiFi Direct® protocol. In other examples, the communication protocol is another type of protocol. In general, at ①, a P2P group owner, (e.g., device 111 in FIG. 2A), transmits device information for a P2P client (e.g., wireless display 113 in FIG. 2A), currently connected to the group owner's P2P group, by including P2P group data with the probe response 203, that is transmitted to device 105. In the FIG. 2A example, group owner/wireless display source, device 111, is connected to a single client, wireless display 113. Thus, the wireless display capacity is determined based on a discovery of the connected wireless display clients, from this P2P group data that is received from P2P group owner 111. It should be appreciated that in the FIG. 2A example, although device 117 and wireless display 119 are located in proximity to device 105 (for example in an adjacent/nearby conference room), probe request 201 determined (not shown) that these devices were not connected (e.g., had not formed a P2P group and were not transmitting/streaming video).

Referring to FIG. 2A, at ②, adaptive transmitter 101a sets the video transmission bitrate of device 105 based on the information received at ① with probe response 203. In the FIG. 2A example, even though the user of device 105 may have desired a video transmission bitrate of 10 megabits per second (Mbps), the video transmission bitrate is reduced to 8 Mbps based on the channel conditions (e.g., the bandwidth usage between 111 and 113) determined at ①. More specifically, adaptive transmitter 101a sets video transmission to 8 Mbps based on the wireless display capacity determined at ①.

Referring to FIG. 2B, at ③, adaptive transmitter 101a executes a periodic scan, to determine wireless display capacity in the proximity of device 105. In one example, the wireless display capacity is based on the determined number of wireless display connections in the proximity. In one example, after the determination of wireless display capacity that is made at ①, and the video transmission bitrate is set based upon the determined wireless display capacity at ②, adaptive transmitter 101a executes scans periodically to determine the existing (current) wireless display capacity.

As shown in FIG. 2B, at CD, based on information obtained from the periodic scan at ③, the video bitrate of devices with wireless display connections in proximity of device 105 is determined. In FIG. 2B, the circular arrow indicates an execution of operation ④ by adaptive transmitter 101a.

As shown in FIG. 2B, at ⑤, adaptive transmitter 101a compares the video bit rate of the devices with wireless display connections in proximity of device 105 to the wireless display capacity. The comparison, based on the information determined at ③ and ④, determines whether the video bit rate of device 105 will be adjusted. In FIG. 2B, the circular arrow indicates an execution of operation ⑤ by adaptive transmitter 101a.

As shown in FIG. 2B, at ⑥, based on information obtained at ③-⑤, it is determined that device 117 is now connected with wireless display 119. Thus, it is determined that devices 111 and 117 are currently connected to wireless display devices in proximity to device 105 (which is also connected). In this example, based on the determination, that devices 105, 111 and 117 are connected, adaptive transmitter 101a determines that the target bit rate should be reduced to 6 Mbps. Thus, the bit rate of device 105 is adjusted downward to 6 Mbps based on current channel conditions. In one example, each of the devices in proximity to device 105 that are transmitting video to a wireless display can be prompted to adjust their bitrate similarly.

Referring to FIG. 2C, at ④, upon a termination of existing wireless display connections in proximity to device 105, adaptive transmitter 101a can increase the video transmission bitrate of device 105 to a desired level in one step, or multiple steps. See FIG. 2C which depicts an increase in the video transmission bitrate of device 105 in conjunction with the termination of connections associated with devices 111 and 117. In one example, the discovery of the termination of existing wireless display connections can occur during a periodic scan (such as is described herein) of the wireless channel for P2P connections. In one example, the video bitrate adaptation described herein can be achieved by adjusting picture quality, screen resolution, and/or frame rate. For example, the video bit rate adaptation can involve a lowering of picture quality that is based on video bit rate reduction.

Figure 3:
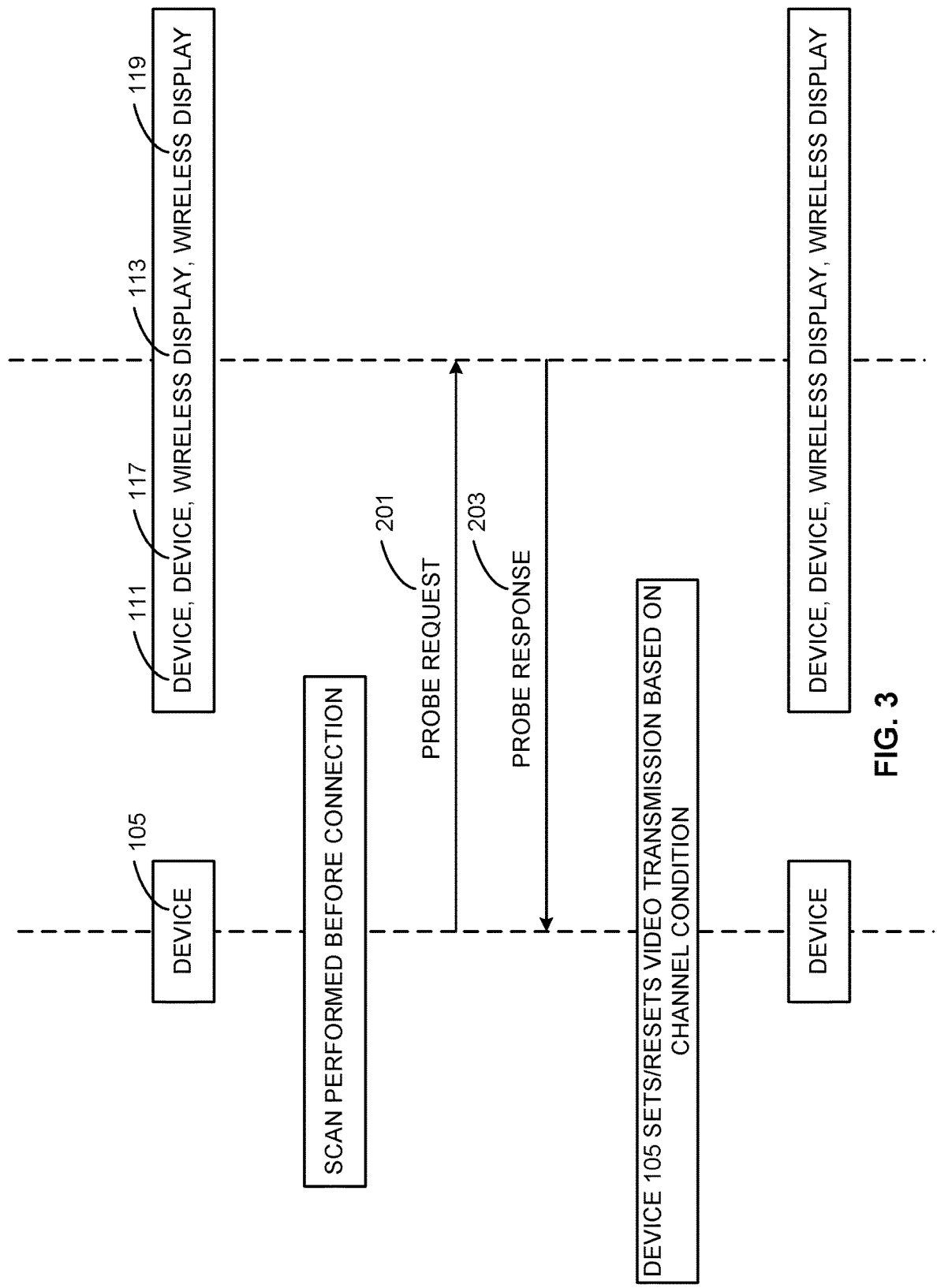
FIG. 3 is a schematic that summarizes operations detailed in FIGS. 2A, 2B and 2C that pertain to adaptive video transmission between video source devices and wireless displays.

FIG. 3 is a schematic that summarizes operations detailed in FIGS. 2A, 2B and 2C that pertain to adaptive video transmission between video source devices and wireless displays. Referring to FIG. 3, in response to a probe request 201 from device 105, to a P2P group owner, and before connection of device 105 to a wireless display for video transmission to the wireless display, a determination of the number of wireless display connections in the group is made (information is produced by group owners in response to probe requests as a part of a P2P wireless communication protocol scan before connection). Response 203, to probe request 201, provides information about the existing number of wireless display connections in the group (e.g., devices 111 and 117, and wireless displays 113 and 119). As described in detail herein, device 105 (via adaptive transmitter 101a) uses the information about the number of wireless display connections in proximity to device 105 to set the video bitrate based on existing channel conditions. Thereafter, a periodic scan is performed in order to determine the wireless display capacity upon which the target bitrate is set.

Figure 4:
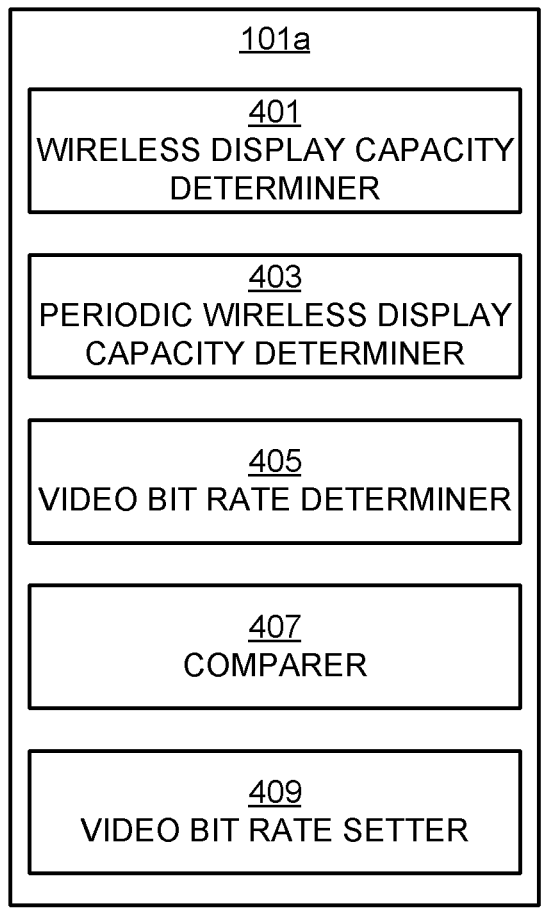
FIG. 4 shows components of an adaptive video transmitter according to one example.

FIG. 4 shows components of an adaptive transmitter 101a according to one example. Components of adaptive transmitter 101a implement an algorithm for adaptive video transmission. Components of adaptive transmitter 101a shown in FIG. 4 include wireless display capacity determiner 401, periodic wireless display capacity determiner 403, video bit rate determiner 405, comparer 407 and video bit rate setter 409.

Wireless display capacity determiner 401 makes an initial or first determination of the collective wireless display capacity (Wcapacity) in proximity of a wireless display source device. In one example, the collective wireless display capacity is determined from information that is obtained by the wireless display source device from P2P group owners about wireless display connections in their groups. In one example, WiFi direct protocol is used to discover information about devices that are connected in a group. In another example, another communication protocol is used to discover information about devices that are connected in a group. In one example, the collective wireless display capacity is equal to the wireless channel capacity minus non wireless display traffic throughput.

Periodic wireless display capacity determiner 403 makes subsequent determinations of collective wireless display capacity in the proximity of the wireless display source device. In one example, a determination of the collective wireless display capacity is based on information that is discovered in a scan for wireless display connections located in the proximity of the wireless display source device that is associated with adaptive transmitter 101a. In one example, the collective wireless display capacity is based on the number of wireless display connections that are determined to be in proximity to the wireless display source device.

Video bit rate determiner 405 determines the collective video bit rate (Trate) of devices with wireless display connections in proximity to the wireless display source device. In one example, an initial determination of the collective video bit rate of devices with wireless display connections in proximity to the wireless display source device is based on information that is discovered from P2P group owners from which the wireless display capacity is derived (e.g., by wireless display capacity determiner 401). Thereafter, the determination of the collective video bit rate of devices with wireless display connections in proximity to the wireless display source device is based on a P2P scan that determines collective wireless display capacity based on the number of wireless display connections that are identified in proximity to the wireless display source device (e.g., by wireless channel capacity determiner 403). In one example, the collective video bit rate of devices with wireless display connections in proximity to the wireless display source device is equal to the number of wireless display connections (Nc), e.g., number of devices connected to wireless displays, times a determined video bit rate (Vbr) for wireless display connections. For example, if a determined video bit rate Vbr for wireless display connections is 10 Mbps, and there are four wireless display connections, then the collective video bit rate is 40 Mbps.

Comparer 407 compares a collective video bit rate of the wireless display connections in proximity to the wireless display source device to the collective wireless display capacity. In one example, the comparison determines whether the collective video bit rate of the wireless display connections that are connected in proximity to wireless display source device is greater than the collective wireless display capacity in proximity to wireless display source device. In one example, the comparison determines whether the bit rate of the video that is transmitted from the wireless display source device is adjusted.

Video bit rate setter 409 sets a video bit rate of the source wireless display device based on the comparing performed by comparer 407. In one example, the video bit rate is set/adjusted to a target bit rate (VbrConstant) that is based on the collective wireless display capacity that has been determined. In one example, adjustments can be made in one or more stages.

It should be appreciated that the aforementioned components of adaptive transmitter 101a can be implemented in hardware or software or in a combination of both. In one example, components and operations of adaptive transmitter 101a can be encompassed by components and operations of one or more computer components. In another example, components and operations of adaptive 101a can be separate from the aforementioned one or more computer components but can operate cooperatively with components and operations thereof.

While an example manner of implementing the adaptive transmitter 101a of FIG. 1 is illustrated in FIG. 4, one or more of the elements, processes and/or devices illustrated in FIG. 4 may be combined, divided, re-arranged, omitted, eliminated and/or implemented in any other way. Further, the example wireless display capacity determiner 401, periodic wireless display capacity determiner 403, video bit rate determiner 405, comparer 407 and video bit rate setter 409 and/or, more generally, the example adaptive transmitter 101a of FIG. 4 may be implemented by hardware, software, firmware and/or any combination of hardware, software and/or firmware. Thus, for example, any of the example components of the adaptive video transmitter and/or, more generally, the adaptive video transmitter 101 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, wireless display capacity determiner 401, periodic wireless display capacity determiner 403, video bit rate determiner 405, comparer 407 and video bit rate setter 409 is/are hereby expressly defined to include a tangible computer readable storage device or storage disk such as a memory, a digital versatile disk (DVD), a compact disk (CD), a Blu-ray disk, etc. storing the software and/or firmware. Further still, the example adaptive transmitter 101 of FIG. 1 may include one or more elements, processes and/or devices in addition to, or instead of, those illustrated in FIG. 4, and/or may include more than one of any or all of the illustrated elements, processes and devices.

Figure 5:
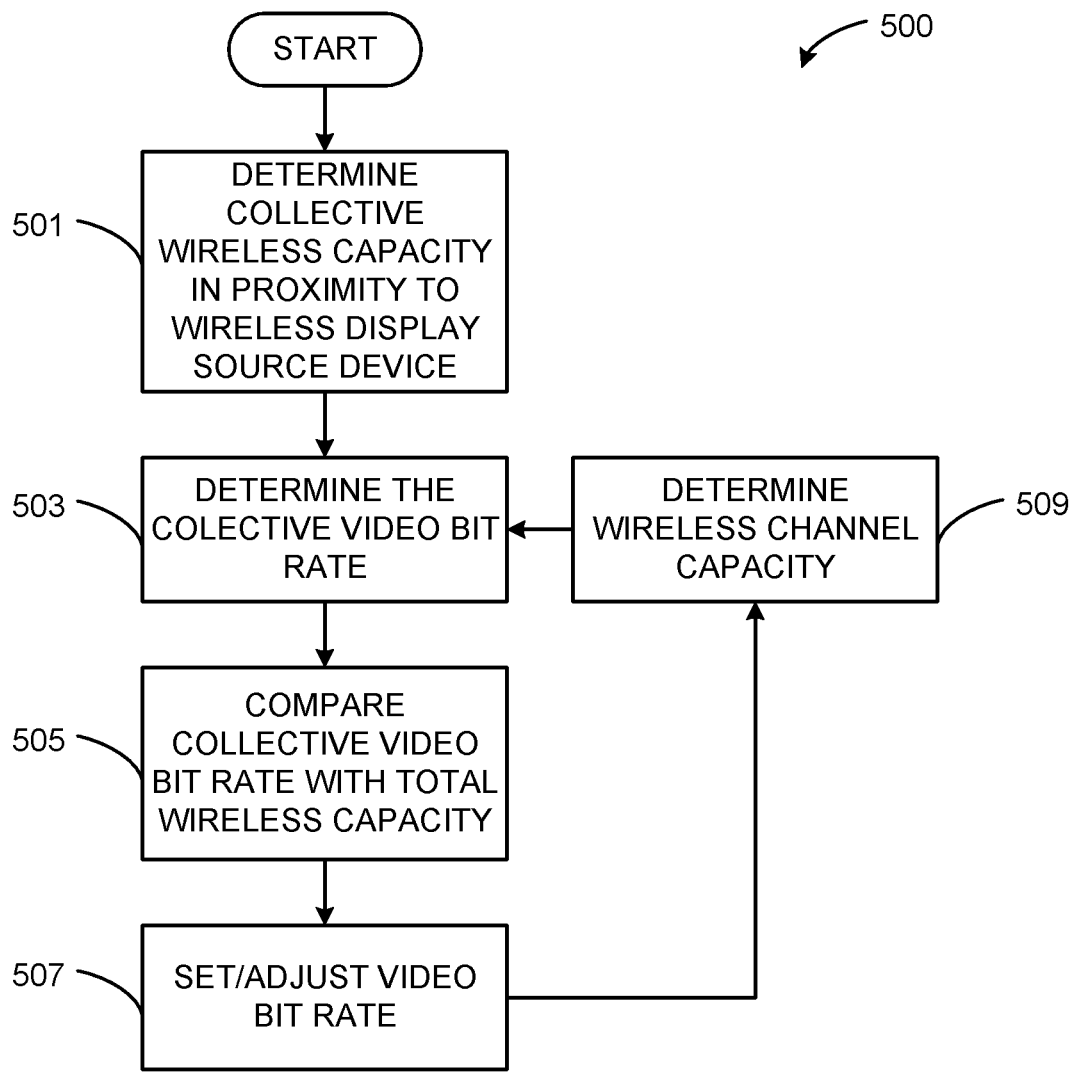
FIG. 5 shows a flowchart representative of example machine readable instructions that may be executed to implement the example adaptive video transmitter of FIG. 1 to carry out a method for adaptive video transmission according to one example.
Figure 6:
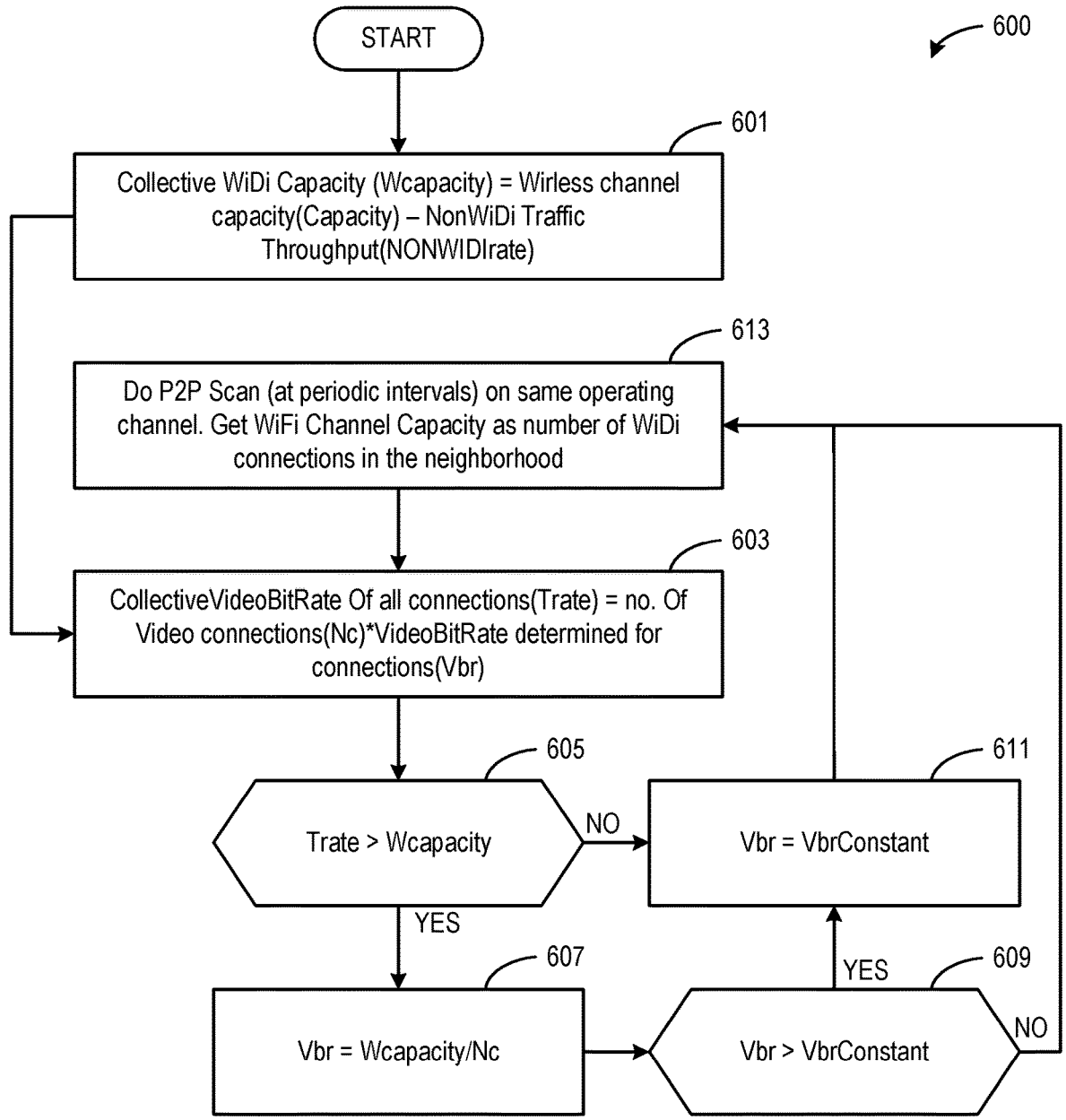
FIG. 6 is a flowchart representative of example machine readable instructions that may be executed to implement the example adaptive video transmitter of FIG. 1 to carry out a method for adaptive video transmission according to a second example.

A flowchart representative of example machine readable instructions for implementing the adaptive transmitter of FIG. 1 is shown in FIG. 5-6. In this example, the machine readable instructions comprise a program for execution by a processor such as the processor 712 shown in the example processor platform 700 discussed below in connection with FIG. 7. The program may be embodied in software stored on a tangible computer readable storage medium such as a compact disk read-only memory (CD-ROM), a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 7, many other methods of implementing the example adaptive video transmitter 101 may alternatively be used. For example, the order of execution of the blocks may be changed, and/or some of the blocks described may be changed, eliminated, or combined.

As mentioned above, the example processes of FIGS. 5-6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 5-6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 5 shows a flowchart 500 of a method for adaptive video transmission according to one example. The flowchart includes processes that, in one example, can be carried out by processors and electrical components under the control of computer-readable and computer-executable instructions. Although specific steps are disclosed in the flowcharts, such steps are exemplary. That is the present example is well suited to performing various other steps or variations of the steps recited in the flowchart.

Wireless display capacity determiner 401 (FIG. 4) makes an initial determination of the collective wireless display capacity in proximity of a wireless display source device (block 501). In one example, collective wireless display capacity is determined from information that is obtained from P2P group owners about wireless connections in associated groups. In one example, WiFi direct protocol is used to discover information about wireless display connections in a P2P group. In another example, another communication protocol is used to discover information about wireless display connections in a P2P group. In one example, the initial determination of the collective wireless display capacity is equal to the wireless channel capacity minus the non-wireless display traffic throughput. The determined collective wireless display capacity is provided to block 505.

Video bit rate determiner 405 (FIG. 4) determines the collective video bit rate of the wireless display connections in proximity to the wireless display source device (block 503). In one example, an initial determination of the collective video bit rate is based on information that is discovered from P2P group owners from which the wireless display capacity is derived (e.g., by periodic wireless display capacity determiner 401). Thereafter, the determination of collective video bit rate is based on a P2P scan that determines collective wireless display capacity based on the number of wireless display connections that are identified in proximity to the wireless display source device (e.g., by wireless channel capacity determiner 403). In one example, the collective video bit rate (Trate) is equal to the number of wireless display connections (Nc), e.g., number of devices connected to wireless displays, times a determined video bit rate (Vbr) for wireless display connections.

Comparer 407 compares the collective video bit rate of the wireless display connections in proximity to the wireless source device to the collective wireless display capacity (block 505). In one example, the comparison determines whether the collective video bit rate of the wireless display connections is greater than the collective wireless display capacity in proximity to the wireless display source device. In one example, the outcome of the comparison determines the setting/adjusting of the bit rate of the video that is transmitted from the wireless display source device.

Video bit rate setter 409 (FIG. 4) sets/adjusts a video bit rate of the wireless display source device based on the comparing performed by comparer 407 (block 507). In one example, the setting/adjusting of a video bit rate can be made in one or more stages. In some examples, no adjustments may be needed.

Periodic wireless display capacity determiner 403 (FIG. 4) makes periodic determinations of collective wireless display capacity in the proximity of the first wireless source device (block 509), subsequent to the initial determination of collective wireless display capacity in the proximity of the first wireless source device. In one example, the determination of collective wireless display capacity is based on information that is discovered in a scan for wireless display connections located in proximity of the wireless display source device. The collective wireless display capacity thus determined is provided to block 503.

FIG. 6 is a flowchart 600 of a method for determining video transmission bitrate according to one example.

Wireless display capacity determiner 401 (FIG. 4) determines the collective wireless display capacity in proximity to a wireless display source device (block 601). In one example, in an initial, determination, collective wireless display capacity is determined as equal to the wireless channel capacity minus the non-wireless display traffic throughput.

Video bit rate determiner 405 (FIG. 4) determines the collective video bit rate of the connections (source-sink connections) in proximity to the wireless display source device (block 603). In one example, the collective video bit rate is equal to the number of video connections (Nc), e.g., number of devices connected to wireless displays, times a determined video bit rate (Vbr) for wireless display connections.

Comparer 407 compares the collective video bit rate of wireless connections in proximity of the wireless display source device to the collective wireless display capacity (block 605). In one example, the comparison determines whether the collective video bit rate of the wireless display connections in proximity to the wireless display source device is greater than the collective wireless display capacity in proximity to the wireless display source device.

Video bit rate setter 409 sets the video bit rate of the wireless display source device to be equal to the collective wireless display capacity divided by the number of video connections in proximity to the wireless display source device, if the collective video bit rate of the connections in the proximity is greater than the collective wireless display capacity (block 607). Control moves to block 609.

After control moves to block 609, if the video bit rate of the wireless display source device is greater than the target bit rate (block 609), control goes to block 611 where video bit rate setter 409 sets the video bit rate to the target bit rate (VbrConstant). If the video bit rate of the wireless display source is not greater than the target bit rate, control goes to block 613. If the collective video bit rate is not greater than the collective wireless display capacity in proximity to the wireless display source device, video bit rate setter 409 sets the video bit rate to a target bit rate (block 611).

Periodic wireless display capacity determiner 403 (FIG. 4) makes periodic determinations of the collective wireless display capacity in the proximity of the wireless display source device (block 613). In one example, the collective wireless display capacity that is determined by periodic wireless display capacity determiner 403 is based on the number of wireless display connections that are in the proximity. The output of block 613 is provided to block 603.

In some examples, video bit rate setter 409 can allow the video bit rate of a wireless display source device to be set to a different video bit rate than the video bit rate of one or more other wireless display source devices operating in the proximity, where the collective video bit rate of the wireless display source devices (wireless display connections) operating in the vicinity is less than the collective wireless display capacity.

Figure 7:
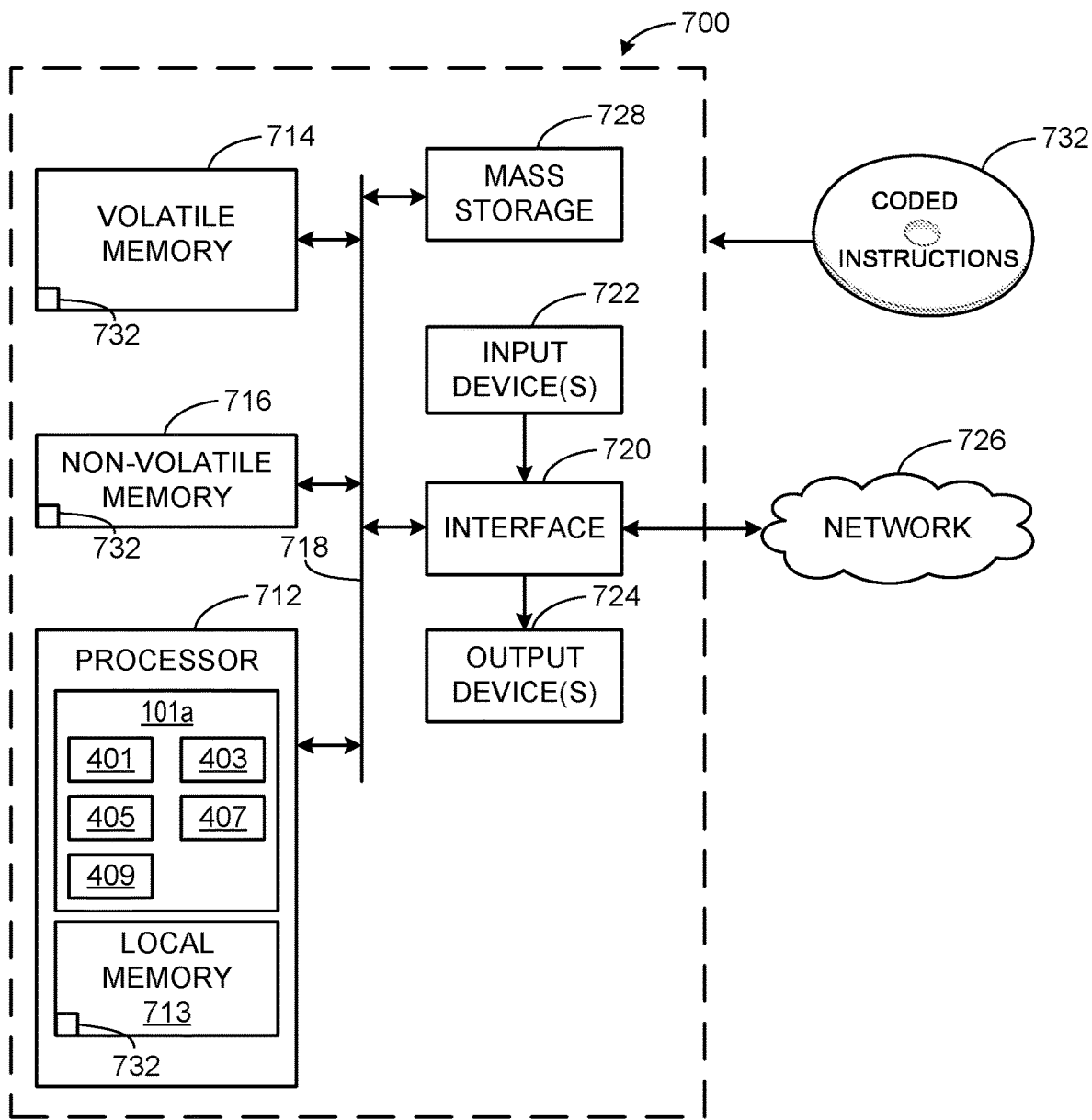
FIG. 7 is a block diagram of an example processor platform that may execute machine-readable instructions of FIGS. 5-6 to implement the adaptive video transmitter according to one example.

FIG. 7 is a block diagram of an example processor platform 700 capable of executing the instructions of FIGS. 5 and 6 to implement the apparatus of FIG. 4. The processor platform 700 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

In one example, collaborative content renderer 101a can be included as a part of processor 712. In one example, collaborative content renderer 101a can be constituted by circuitry that implements an algorithm for collaborative content rendering.

The processor platform 700 of the illustrated example also includes an interface circuit 720. The interface circuit 720 may be implemented by any type of interface standard, such as an Ethernet interface, a universal serial bus (USB), and/or a peripheral component interconnect (PCI) express interface.

In the illustrated example, one or more input devices 722 are connected to the interface circuit 720. The input device(s) 722 permit(s) a user to enter data and commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

The coded instructions 732 of FIGS. 5 and 6 may be stored in the mass storage device 728, in the volatile memory 714, in the non-volatile memory 716, and/or on a removable tangible computer readable storage medium such as a CD or DVD.

Example 1 is an apparatus for adaptive video transmission based on channel capacity, the apparatus comprising, a wireless display capacity determiner to determine a first wireless display capacity in proximity to a wireless display source device, based on information that is received from a wireless channel scan associated with a formation of a peer-to-peer (P2P) group, a video bit rate determiner to determine a video bit rate of one or more devices with wireless display connections in the proximity, a comparer to compare the video bit rate of the one or more devices with wireless display connections in the proximity to wireless display capacity, a video bit rate setter to, based on the comparing, set a video bit rate of the wireless display source device, and a periodic wireless display capacity determiner to periodically determine a second wireless display capacity in the proximity of the wireless display source device, based on a scan of at least one wireless channel to determine wireless display connections in the proximity.

Example 2 includes an apparatus as defined in example 1, wherein the first wireless display capacity is determined by subtracting non-wireless display traffic throughput from wireless channel capacity.

Example 3 includes an apparatus as defined in example 1, wherein the information that is received from a wireless channel scan associated with the formation of the P2P group is from a P2P group owner.

Example 4 includes an apparatus as defined in example 1 wherein setting a video bit rate of the wireless display source device includes determining whether the video bit rate of the one or more devices with wireless display connections is greater than a current wireless display capacity.

Example 5 includes an apparatus as defined in example 1, wherein the determining the video bit rate of the one or more devices with wireless display connections in the proximity includes determining a number of devices with wireless display connections times a determined video bit rate for the wireless display connections.

Example 6 includes an apparatus as defined in example 1, wherein setting the video bit rate of the wireless display source device includes a video bit rate reduction.

Example 7 includes an apparatus as defined in example 1, wherein the video bit rate reduction includes a lowering of picture quality, a reduction in screen resolution and/or a reduction in frame rate.

Example 8 includes a method for adaptive video transmission
based on channel capacity, the method comprising, a) determining a first wireless display capacity in a proximity of a wireless display source device based on information that is received from a wireless channel scan associated with a formation of a (P2P) peer-to-peer group that includes the wireless display source device and a wireless display, b) determining a video bit rate of one or more devices with wireless display connections in the proximity, c) comparing the video bit rate of the one or more devices with wireless display connections in the proximity to wireless display capacity, d) based on the comparing, setting a video bit rate of the wireless display source device, e) determining a second wireless display capacity in the proximity of the wireless display source device based on a wireless channel scan of a wireless channel to determine wireless display connections in the proximity; and, repeating b) through e).

Example 9 includes a method as defined in example 8, wherein
the first wireless display capacity is determined by subtracting non-wireless display traffic throughput from wireless channel capacity.

Example 10 includes a method as defined in example 8, wherein the information that is received from a wireless channel scan associated with the formation of the P2P group is from a P2P group owner.

Example 11 includes a method as defined in example 8, wherein setting the video bit rate of the wireless display source device includes determining whether the video bit rate of the one or more devices with wireless display connections is greater than the wireless display capacity.

Example 12 includes a method as defined in example 8, wherein the determining the video bit rate of the one or more devices with wireless display connections in the proximity includes determining a number of devices with wireless display connections times a determined video bit rate for the wireless display connections.

Example 13 includes a method as defined in example 8, wherein setting the video bit rate of the wireless display source device includes a video bit rate reduction.

Example 14 includes a method as defined in example 13, wherein the video bit rate reduction includes a lowering of picture quality, a reduction in screen resolution and/or a reduction in frame rate.

Example 15 includes a computer readable storage medium
comprising instructions that, when executed, cause a machine to at least, a) determine a first wireless display capacity in a proximity of a wireless display source device based on information that is received from a wireless channel scan associated with a formation of a (P2P) peer-to-peer group that includes the wireless display source device and a wireless display, b) determine a video bit rate of one or more devices with wireless display connections in the proximity, c) comparing a video bit rate of the one or more devices with wireless display connections in the proximity to wireless display capacity, d) based on the comparing, setting a video bit rate of the wireless display source device, e) determining a second wireless display capacity in the proximity of the wireless display source device based on a wireless channel scan of a wireless channel to determine wireless display connections in the proximity, and, repeating b) through e).

Example 16 includes a storage medium as defined in example
15, wherein the first wireless display capacity is determined by subtracting non-wireless display traffic throughput from wireless channel capacity.

Example 17 includes a storage medium as defined in example
15, wherein the information that is received from a wireless channel scan associated with the formation of the P2P group is from a P2P group owner.

Example 18 includes a storage medium as defined in example
15, wherein setting a video bit rate of the wireless display source device includes determining whether the video bit rate of the one or more devices with wireless display connections is greater than the wireless display capacity.

Example 19 includes a storage medium as defined in example 15, wherein the determining the video bit rate of the one or more device with wireless display connections in the proximity includes determining a number of devices with wireless display connections times a determined video bit rate for the wireless display connections.

Example 20 includes a storage medium as defined in example 15, wherein setting a video bit rate of the wireless display source device includes a video bit rate is reduction.

Example 21 includes a system for adaptive video transmission based on channel capacity, the apparatus comprising, means for determining a first wireless display capacity in proximity to a wireless display source device, based on information that is received from a wireless channel scan associated with a formation of a peer-to-peer (P2P) group that includes the wireless display source device and a wireless display device, means for determining a video bit rate of one or more devices with wireless display connections in the proximity, means for comparing the video bit rate of the one or more devices with wireless display connections in the proximity to wireless display capacity, means for, based on the comparing, setting a video bit rate of the wireless display source device, and means for periodically determining a second wireless display capacity in the proximity of the wireless display source device, based on a scan of at least one wireless channel to determine wireless display connections in the proximity, the determined wireless display capacity is provided as an input to the bit rate determiner.

Example 22 includes the system as defined in example 21, wherein the first wireless display capacity is determined by subtracting non-wireless display traffic throughput from wireless channel capacity.

Example 23 includes the system as defined in example 21, wherein the information that is received from a wireless channel scan associated with the formation of the P2P group is from a P2P group owner.

Example 24 includes the system as defined in example 21, wherein setting a video bit rate of the wireless display source device includes determining whether the video bit rate of the one or more devices with wireless display connections is greater than a current wireless display capacity.

Example 25 includes the system as defined in example 21, wherein the determining the video bit rate of the one or more devices with wireless display connections in the proximity includes determining a number of devices with wireless display connections times a determined video bit rate for the wireless display connections.

Example 26 includes the system as defined in example 21, wherein setting the video bit rate of the wireless display source device includes a video bit rate reduction.

Example 27 includes the system as defined in example 21, wherein the video bit rate reduction includes a lowering of picture quality, a reduction in screen resolution and/or a reduction in frame rate.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A first wireless display source device for adaptive video transmission based on channel capacity, the first wireless display source device comprising:

a video bit rate determiner to determine a collective video bit rate based on a current number of wireless display connections in a peer-to-peer (P2P) group and a current video bit rate of the first wireless display source device, the P2P group including a second wireless display source device in proximity to the first wireless display source device;

a comparer to compare the collective video bit rate to a wireless display capacity determined based on P2P group data obtained at the first wireless display source device from the second wireless display source device; and a video bit rate setter to:
set the current video bit rate of the first wireless display source device to an adjusted video bit rate value in response to the comparer determining that the collective video bit rate is greater than the wireless display capacity, the adjusted video bit rate value based on the wireless display capacity and the current number of wireless display connections; and
set the current video bit rate of the first wireless display source device to a target video bit rate value in response to the comparer determining that the collective video bit rate is not greater than the wireless display capacity.

2. The first wireless display source device of claim 1, further including a wireless display capacity determiner to determine the wireless display capacity by subtracting non-wireless display traffic throughput from wireless channel capacity.

3. The first wireless display source device of claim 1, wherein the second wireless display source device is a group owner of the P2P group.

4. The first wireless display source device of claim 1, wherein the video bit rate setter is to set the current video bit rate of the first wireless display source device to the adjusted video bit rate value by executing a video bit rate reduction.

5. The first wireless display source device of claim 4, wherein the video bit rate setter is to execute the video bit rate reduction by at least one of a lowering of picture quality, reducing a screen resolution, or reducing a frame rate.

6. The first wireless display source device of claim 1, wherein, in response to (A) setting the current video bit rate of the first wireless display source device to the adjusted video bit rate value, and (B) determining that the adjusted video bit rate value is greater than the target video bit rate, the video bit rate setter is to set the current video bit rate of the first wireless display source device to the target video bit rate.

7. The first wireless display source device of claim 1, further including a periodic wireless display capacity determiner to periodically determine, based on a wireless channel scan, an updated wireless display capacity.

8. A non-transitory computer readable storage medium comprising instructions that, when executed, cause a first wireless display source device to at least:

determine a collective video bit rate based on a current number of wireless display connections in a peer-to-peer (P2P) group and a current video bit rate of the first wireless display source device, the P2P group including a second wireless display source device in proximity to the first wireless display source device;

compare the collective video bit rate to a wireless display capacity determined based on P2P group data obtained at the first wireless display source device from the second wireless display source device; and adjust the current video bit rate of the first wireless display source device by:
  setting the current video bit rate to an adjusted video bit rate value in response to determining that the collective video bit rate is greater than the wireless display capacity, the adjusted video bit rate value based on the wireless display capacity and the current number of wireless display connections; and
  setting the current video bit rate to a target video bit rate value in response to determining that the collective video bit rate is not greater than the wireless display capacity.

9. The non-transitory computer readable storage medium of claim 8, wherein the instructions cause the first wireless display source device to determine the first wireless display capacity by subtracting non-wireless display traffic throughput from wireless channel capacity.

10. The non-transitory computer readable storage medium of claim 8, wherein the second wireless display source device is a group owner of the P2P group.

11. The non-transitory computer readable storage medium of claim 8, wherein the instructions cause the first wireless display source device to adjust the current video bit rate of the first wireless display source device to the adjusted video bit rate value by executing a video bit rate reduction.

12. The non-transitory computer readable storage medium of claim 11, wherein the instructions cause the first wireless display source device to execute the video bit rate reduction by at least one of a lowering of picture quality, reducing a screen resolution, or reducing a frame rate.

13. The non-transitory computer readable storage medium of claim 8, wherein the instructions, when executed, cause the first wireless display source device, in response to (A) the setting of the current video bit rate of the first wireless display source device to the adjusted video bit rate value, and (B) determining that the adjusted video bit rate value is greater than the target video bit rate, to set the current video bit rate of the first wireless display source device to the target video bit rate.

14. The non-transitory computer readable storage medium of claim 8, wherein the instructions, when executed, cause the first wireless display source device to periodically determine, based on a wireless channel scan, an updated wireless display capacity.

15. A method for adaptive video transmission based on channel capacity, the method performed at a first wireless display source device, the method comprising:
  determining a collective video bit rate based on a current number of wireless display connections in a peer-to-peer (P2P) group and a current video bit rate of the first wireless display source device, the P2P group including a second wireless display source device in proximity to the first wireless display source device;
  comparing the collective video bit rate to a wireless display capacity determined based on P2P group data obtained at the first wireless display source device from the second wireless display source device; and
  adjusting the current video bit rate of the first wireless display source device by:
    setting the current video bit rate to an adjusted video bit rate value in response to determining that the collective video bit rate is greater than the wireless display capacity, the adjusted video bit rate value based on the wireless display capacity and the current number of wireless display connections; and
    setting the video bit rate to a target video bit rate value in response to determining that the collective video bit rate is not greater than the wireless display capacity.

16. The method of claim 15, wherein the determining of the wireless display capacity includes subtracting non-wireless display traffic throughput from wireless channel capacity.

17. The method of claim 15, wherein the setting of the current video bit rate of the first wireless display source device to the adjusted video bit rate value includes executing a video bit rate reduction.

18. The method of claim 17, wherein executing the video bit rate reduction includes at least one of a lowering of picture quality, reducing a screen resolution, or reducing a frame rate.

19. The method of claim 15, further including, in response to (A) the setting of the current video bit rate of the first wireless display source device to the adjusted video bit rate value, and (B) determining that the adjusted video bit rate value is greater than the target video bit rate, setting the current video bit rate of the first wireless display source device to the target video bit rate.

20. The method of claim 15, further including periodically determining, based on a wireless channel scan initiated from the first wireless display source device, an updated wireless display capacity.

* * * * *